H. P. HOPPE.
SAFETY SIGNAL FOR STREET CARS.
APPLICATION FILED MAR. 28, 1921.

1,389,660.

Patented Sept. 6, 1921.

STOP!
DO NOT CROSS
SAFETY FIRST.

Inventor
Herbert P. Hoppe
By H. M. Plaisted
Attorney.

UNITED STATES PATENT OFFICE.

HERBERT P. HOPPE, OF ST. LOUIS, MISSOURI.

SAFETY-SIGNAL FOR STREET-CARS.

1,389,660.  Specification of Letters Patent.  Patented Sept. 6, 1921.

Application filed March 28, 1921. Serial No. 456,212.

*To all whom it may concern:*

Be it known that I, HERBERT P. HOPPE, a citizen of the United States, residing at St. Louis, State of Missouri, have invented certain new and useful Improvements in Safety-Signals for Street-Cars, of which the following is a specification.

This invention relates to certain new and useful improvements in safety signals for street cars, the peculiarities of which will be hereinafter fully described and claimed.

The main object of my invention is the provision of a warning signal at the rear end of a street car to warn passengers alighting from the car against the carelessness of passing behind the car without looking for the approach of another car or vehicle; secondly to provide means for operating the warning signal by the motorman to indicate the approach of a car from the opposite direction; thirdly to provide means for the automatic operation of such a signal upon the stopping of the street car; fourthly, provide means for cutting out the automatic operation of said signal upon the stoppage of the car and placing the signal under control of the motorman to allow of his giving a warning signal in case of backing up the street car, and also to avoid operating the signal when the car is stopped for other purposes than to discharge passengers; fifthly to provide such a warning signal so as to be audible, or visible, or both audible and visible.

Figure 3:
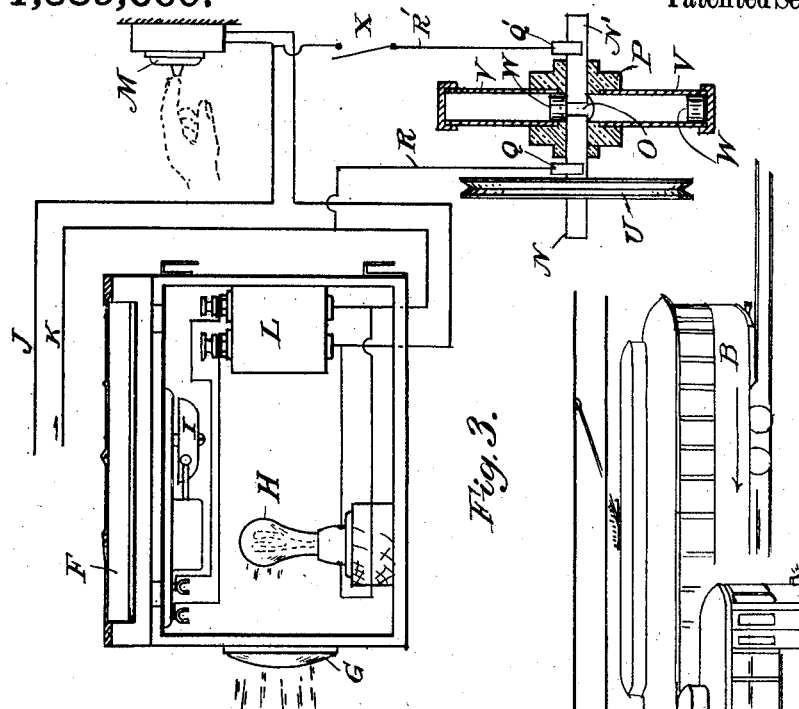
Figure 2:
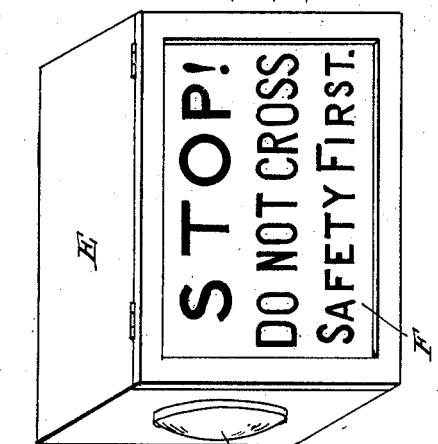
Figure 1:
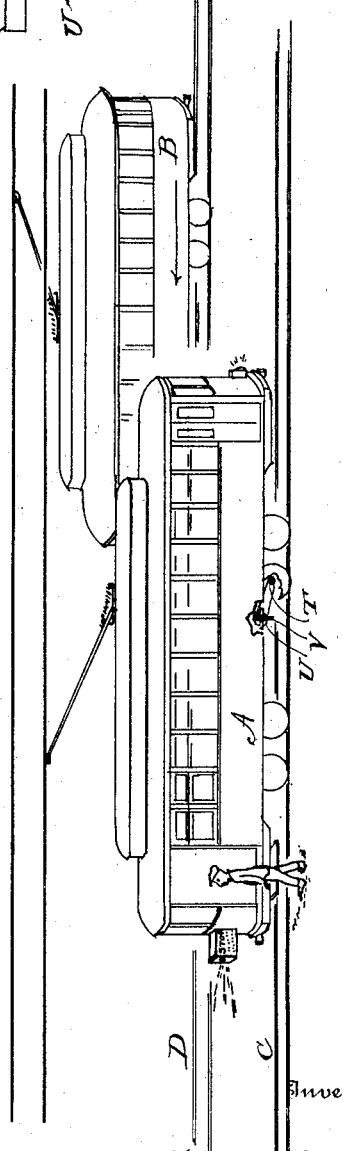

In the accompanying drawing on which like reference letters indicate corresponding parts, Figure 1 represents two street cars on adjacent tracks, one being stopped and the other about to pass the first car from which a passenger has alighted and is about to pass behind his car, and indicating my improved safety signal applied thereto; Fig. 2 a box with cautionary words on a translucent side, a red lens in the rear of the box, and designed to be carried on the rear of a street-car; Fig. 3 an inside view of the box shown in Fig. 2 the side sign being raised,—a bell and a lamp shown within said box as audible and visible signals, electrical connections for said lamp and bell, and a manual circuit closer and an automatic circuit closer in said circuit for operating the same; and Fig. 4 a detailed view of one form of automatic circuit closer and its connection to a car axle for driving. When a passenger alights from the rear of a street car and passes behind said car to cross the double track, he is exposed to the danger of being run down by a street car approaching in the opposite direction on the adjacent track. My safety signal is designed to warn the passenger to use care in crossing said tracks, as well as to give especial notice by the motorman of the approach of a car in the opposite direction. Likewise when a car has stopped and is about to back up the motorman can give a warning signal to any automobile or vehicle in the rear of his car by means of my device, as well as to the passengers who have alighted and are about to cross the track behind the car.

Likewise it is within the scope of my invention to call attention automatically to the danger of crossing behind a car when a passenger has alighted from said car, and so train the passengers that it will become a fixed habit to stop, look and listen in passing behind a car from which they have alighted. Thus the danger of being run down by a car approaching from the opposite direction will be reduced to a minimum.

Referring to the drawing, letter A designates a car that has stopped and B a car that is approaching the former car, on the adjacent tracks C and D respectively,—the car A being on the track C. A person alighting from the car A as indicated and about to pass behind said car will be warned by a signal that is visible,—such visible signal being preferably in the form of a box E having one side F translucent and bearing cautionary words, such as "Stop. Do not cross. Safety first"—as shown in Fig. 2. The rear end of said box has a red lens G. A lamp, prefereably incandescent and electrically connected, designated H Fig. 3 is mounted opposite the translucent side F and the red lens G so that when it is lighted by means hereafter described, it will make visible the cautionary words on the translucent side, and throw a red light through the lens G to the rear. The passenger having just alighted and a car B approaching on the opposite track, the visible signal will be actuated by means described hereafter, so that he is warned of the danger.

I also preferably provide a bell I located in said box and suitably connected electrically to a source of supply and in the same circuit with the connections to the lamp, so that an audible signal, in connection with the visible signal, is given simultaneously, and the passenger's attention is directed by the sound of the bell to the cautionary sign illuminated simultaneously.

The electrical connections for said bell and lamp are indicated by J and K respectively connecting the same to a source of supply, such as the lamp circuit of the street car or otherwise, and a transformer L is shown in Fig. 3 adjacent to the bell. In these electrical connections is located a manual circuit closer in the form of a push button M Fig. 3, adjacent to the motorman so that he may operate the visible and audible signals when the car B is seen approaching his car, as before described.

Figure 4:
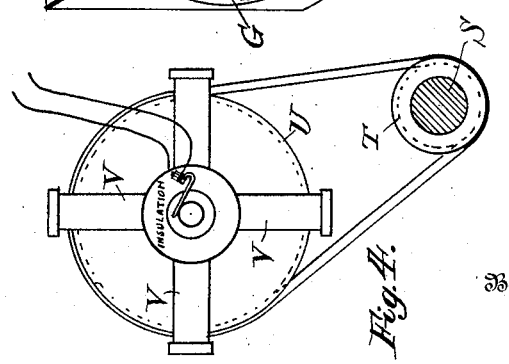

Not only is such warning signal operated by the motorman but I have provided an automatic circuit closer for such signal, which automatic circuit closer is preferably in the form of a rotary shaft in two pieces N and N' Fig. 3, separated by a gap O between the adjacent ends as alined in a hub P of insulating material, shown in section in Fig. 3 and in side view in Fig. 4. On each shaft end is a contact Q, Q', respectively connected by a wire R and R' to the main wires K and J. On the car axle S preferably, is mounted a pulley T that is belted to a pulley U on the divided shaft N—N' by which rotation is given to the shaft and its hub. Mounted in this hub P are a series of radiating tubes V having capped ends, and in the tubes are respectively mounted movable pieces W that are thrown outward by centrifugal force when the shaft and hub are rotated, but which gravitate downward when said shaft is at rest. These radiating tubes V are four in number, so that at least one of said pieces W will contact with the shaft and bridge the gap O when the rotation is stopped by the stoppage of the car, and thereby will automatically close the circuit in the electrical connections and operate the warning signal. When the car is running however, these movable bridge pieces W fly outward and the gap O is opened and the warning signal is not operated automatically.

A switch is provided however in one of the electrical connections, such as R' to the automatic circuit closer,—and is designated X in Fig. 3. By means of this switch the automatic closer is cut out by the motorman whenever he desires to do so,—such as when the car has stopped for other purposes than allowing passengers to alight or when the car is stopped and it is desired to back up. In such cases the motorman will open the cut-out switch X which will render the automatic circuit closer inoperative; he will then operate the warning signal by the manual circuit closer M before mentioned if he desires to back up the car and give warning to any vehicle behind the car; or in the case when no signal is to be given when the car has stopped, simply throwing the cut-out switch X will render the automatic circuit closer inoperative for the time being.

Thus it will be seen that not only the warning signal is visible, but it is audible as well; likewise that said signal is operated by means that are automatic in connection with the stoppage of the car; furthermore that the automatic means may be cut out temporarily and that the warning signal will still remain under control of the motorman for the purposes described.

I claim:

1. The combination with a street car, of a warning signal located at the rear of said car and comprising a cautionary sign, an incandescent lamp for the sign, and a bell, electric connections for said lamp and bell forming an open circuit with a source of supply, a gravitating circuit closer in said connections adapted to actuate said bell and lamp when the car is stopped temporarily, substantially as described.

2. The combination with a street car, of means to produce an electrically operated warning signal at the rear of said car, electric connections for said signal forming an open circuit to a source of supply, a gravitating circuit closer in the line of said connections comprising an insulated rotatable shaft in two insulated parts forming a gap, bridge pieces movably supported by said shaft opposite said gap and maintaining the circuit open by centrifugal action while rotating, and closing the circuit by gravitating action of one of said pieces when rotation ceases, and means to rotate said circuit closer in unison with the car.

3. The combination with a street car, of means to produce an electrically operated warning signal at the rear of said car, electric connections from said signal to a source of supply forming an open circuit, a rotary circuit closer in said circuit rotated by the car axle and adapted to close the circuit automatically when the car stops and open it automatically when the car is running, a second circuit closer in said circuit under control of the motorman in said car, and a switch in said circuit and under control of the motorman for cutting out said automatic circuit closer while maintaining the second circuit closer operative, substantially as described.

4. A safety signal for a street car, comprising a warning signal located at one end of the car, a rotary circuit closer adapted to be rotated by the movement of the car and normally open under rotation but closing automatically when the car stops, and electric connections between said signal and said rotary circuit closer.

5. A safety signal for a street car, comprising a warning signal located at one end of a street car, a rotating gravitating circuit closer consisting of a divided shaft forming an electric gap, an insulating hub carrying said shaft, a series of radiating tubes mounted in said hub opposite said gap, and bridge pieces slidably mounted in said tubes and seeking the outer ends under rotation of the shaft and one at least gravitating to close the shaft gap when stationary, means to rotate said circuit closer in unison with the movement of the car, and electric connections between said circuit closer and said signal.

6. A safety signal for a street car, comprising a warning signal, a rotary circuit closer adapted to be rotated by the movement of the car and normally open while rotating, and closed while not rotating, a manual circuit closer, electric connections forming two open circuits from said signal to the rotary and manual circuit closers respectively, and a cut-out in the circuit to the rotary circuit closer maintaining the latter circuit open when the rotary circuit closer is not rotated and would normally close the circuit, substantially as and for the purpose described.

In testimony whereof I have affixed my signature.

HERBERT P. HOPPE.